Nov. 15, 1966  H. J. ZERNAY  3,284,851
EXTRUDING MEANS HAVING ROTARY HEAD
Filed Feb. 3, 1964  2 Sheets-Sheet 1

INVENTOR.
HENRY J ZERNAY

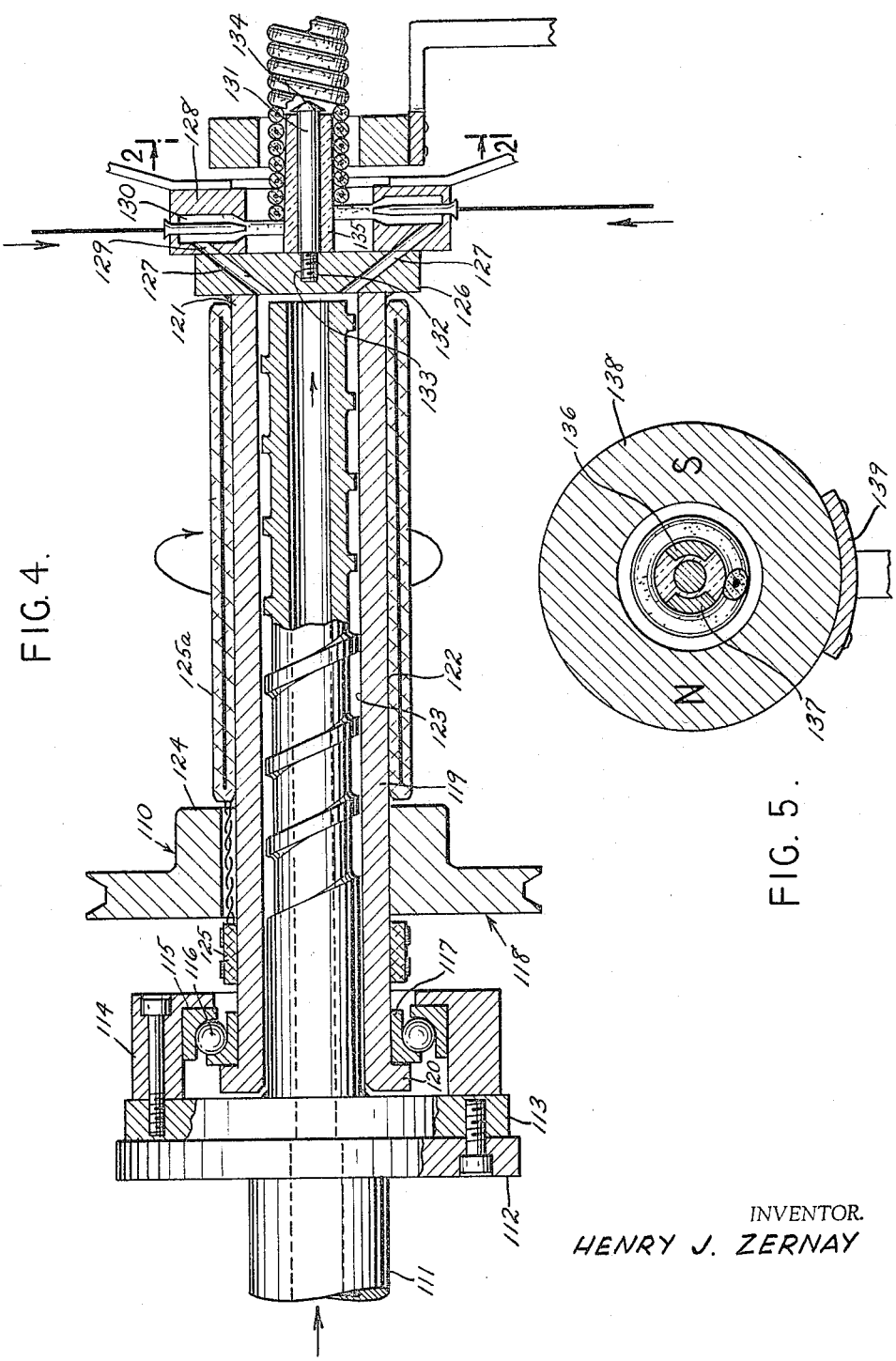

3,284,851
EXTRUDING MEANS HAVING ROTARY HEAD
Henry James Zernay, 37—38 83rd St.,
Jackson Heights, N.Y.
Filed Feb. 3, 1964, Ser. No. 342,019
5 Claims. (Cl. 18—13)

This invention relates generally to the field of synthetic resinous equipment, and more particularly to an improved extruding means for extruding synthetic resinous or similar materials into spiral shapes.

It is known in the art to extrude simple spiral shapes by placing a rotating mandrel in the path of the extruded material, and moving the same axially from one end to the other past the point of extrusion. While reasonably effective, it is apparent that the length of the mandrel is limited by practical considerations, and the mandrel must be stopped at the completion of its path of travel, following which the extruded material is removed therefrom, prior to the commencement of another cycle.

The extruded material must be removed from the mandrel, and the mandrel relocated for receiving further extrudate.

In the present invention, it is contemplated to provide an extruding device which may continuously extrude synthetic resinous material in spiral form upon a concentrically disposed mandrel of any desired cross-section, which mandrel may be of indeterminate length, without interruption during the extruding process.

Another object of the invention lies in the provision of an improved synthetic resinous extruding apparatus capable of extruding a plurality of juxtaposed spirally shaped filaments of material upon a mandrel which is axially advanced while retaining the same against rotational motion about said axis.

A further object of the invention lies in the provision of an improved synthetic resinous extruding device provided with rotating dispensing head means adapted to receive a continuous supply of extrudate from a non-rotating element, in which the rotation of the head in no way interferes with the flow of extrudate therethrough.

Yet another object of the invention lies in the provision of an improved synthetic resinous ejection means possessed of the above enumerated advantages in which the reciprocating head incorporates means for placing in the extruded flow of material a wire or other reinforcing means.

Still another object of the invention lies in the provision of an improved extrusion means of the class described in which the cost of fabrication may be of a reasonably low order, with consequent wide sale, distribution and use.

A feature of the invention lies in the fact that the disclosed embodiments may be used in conjunction with a wide variety of mandrels, of both relatively fixed and rotational types.

These objects and features, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

FIGURE 1 is a fragmentary longitudinal central sectional view, partially in elevation of a first embodiment of the invention.

FIGURE 2 is a fragmentary longitudinal sectional view corresponding to the right hand portion of FIGURE 1, and showing an alternate form of the first embodiment.

FIGURE 3 is a fragmentary longitudinal sectional view corresponding to the right hand portion of FIGURE 1, and showing a second alternate form of the first embodiment.

FIGURE 4 is a fragmentary longitudinal sectional view of a second embodiment of the invention.

FIGURE 5 is an enlarged fragmentary sectional view as seen from the plane 5—5 in FIGURE 4.

In accordance with the invention, the first embodiment thereof, generally indicated by reference character 10 is shown in FIGURE 1 in operative connection with the extrudate outlet 11 of a conventional extrusion machine (not shown). The outlet normally includes a cylindrical tube 12 having a flange 13 at an end thereof, the device 10 including a corresponding flange 15 on a laterally extending inlet 16 leading to a relatively fixed cylindrical housing 17.

The inlet 16 is provided with an axial bore 18 in communication with a bore 19 in the housing 17. Surrounding the outer surface 20 of the housing 17 is an electrical heating means 21 of well known type for maintaining extrudate in thermoplastic condition while passing through the bore 19. At the rightward end of the housing 17, as seen in FIGURE 1, there is provided a transverse flange 22 to facilitate assembly of the device 10.

Secured to the flange 22 by threaded means 24 is a stationary element 25 including fixed bearing means 26, an outer threaded sleeve 27 and an inner sleeve 28.

The fixed bearing means 26 includes a supporting ring 29 fixed by threaded interconnecting means 30 to a circular flange 31 which supports a raceway 32 retaining ball bearings 33. If desired, as shown in FIGURE 1, the supporting ring 29 may be formed integrally with the outer threaded sleeve 27.

The sleeve 27 includes an outer cylindrical surface 35 provided with a continuous thread 36, the purpose of which will more fully appear at a point later in this disclosure. The inner surface 37 thereof is smooth and cylindrical, and corresponds in diameter to that of the bore 19. The rightward end 38 thereof interconnects with an annular wall member 39 having a plurality of longitudinally disposed bores 40. The inner periphery of the wall member 39 interconnects with the outer surface 41 of the inner sleeve 28.

The inner sleeve 28 includes a leftward portion 43, the outer surface 44 of which effects a seal with the bore 19, and a rightward portion 45, the outer surface 46 of which forms a tubular cavity 47 for the passage extrudate. The inner surface 48 thereof is of uniform diameter and extends substantially throughout the entire length of the inner sleeve 28.

Mounted concentrically with respect to the stationary element 25 is a rotating element 50, including an outer sleeve member 51, an end wall member 52, and inner sleeve member 53 and an extrusion head member 54.

The outer sleeve member 51 includes a leftward end 57 provided with a flange 58 supporting a raceway 59 engaging the ball bearings 33 to permit relative motion between the stationary element 25 and the rotating element 50. The outer cylindrical surface 60 is provided with electrical heating means 61, and receives power through conductors 62 communicating with a pair of commutator rings 63 on a belt pulley 64, current being transmitted through the commutator ring 63 by sliding brushes (not shown). Belt means (not shown) engages the pulley 64 to provide rotational motion for the element 50 during the operation. The inner cylindrical surface 65 of the outer sleeve member 51 is of diameter corresponding to the major diameter of the threads 36, the precise tolerances therebetween depending upon the viscosity of the heated extrudate during operation.

The end wall member 52 interconnects the outer sleeve member 51 with the inner sleeve member 53, and includes an inner surface 67, and outer surface 68 and connecting passages 69 extending therebetween. An inner cylindrical surface 70 is provided with threads 71 engageable with corresponding threads 72 on the inner sleeve member 53.

The inner sleeve member 53 includes a leftward portion 74, the outer surface 75 of which forms a bearing against the surface 48 of the inner sleeve 28 of the stationary element 25. The right hand portion 76 includes an outer cylindrical surface 77 having a continuous thread 78 thereon, the major diameter of which corresponds to that of the surface 37.

The inner continuous surface 79 extends the entire length of the inner sleeve member 53, and is provided at first and second ends 80 and 81, respectively, with flexible mandrel supporting members 82 which serve to guide a mandrel 83 which may be of any desired cross sectional shape. The extrusion head member 54 is fixed to the end wall member 52, and includes a ring member 85 bounded by inner and outer end surfaces 86 and 87, respectively, and an outer cylindrical surface 88, and an inner cylindrical surface 89.

Longitudinal channels 90 communicate with a continuous annular channel 91, and with the passages 69 in the end wall member 52. Communicating with the channel 91 are a pair of hollow guides 92 through which wire cores 93 are inserted to permit the forming of extrudate therearound prior to the application of the extrudate in spiral form upon the mandrel 83. The cross-sections of the extrudate is determined by an orifice circular insert 94, preferably of a type which may be interchanged with similar inserts (not shown) having varied openings in corresponding locations. Secured to the outer end surface 87 is a support member 95, upon which are mounted spools for supplying the wire cores 93.

During operation, extrudate travels through the bore 18 to the bore 19, under pressure, and thence through the bores 40 in the annular wall member 39. The extrudate is prevented from moving leftwardly, as seen in FIGURE 1, by the reaction of the threads 36 and 78 as the rotating element 50 is moved with respect to the stationary element 25. Extrudate then flows through the passages 69 to the head member 54 to be dispensed in the manner illustrated. During operation, the mandrel 83 is advanced rightwardly to permit the extrudate to be spirally wound thereupon wherein the same assumes the appearance shown in the right hand portion of FIGURE 1.

Turning now to the first alternate form of the first embodiment illustrated in FIGURE 2, parts corresponding to those of the principle form have been designated by similar reference characters with the suffix "a."

In the alternate form of FIGURE 2, the mandrel 83 is replaced by a fixed mandrel fitting 97, including a hollow central bore 98. The outer surface 99 thereof communicates with the bore 98 through a plurality of laterally arranged passages 100. A supply conduit 101 is connected with a source of compressed air (not shown) to permit the introduction of air between the spiral formed by the extrudate and the outer surface 99, to facilitate removal of the same. In this form, the mandrel fitting 97 is of relatively short length, and as the spiral is formed it may be slid from engagement therewith, thereby eliminating the necessity of mandrel advancement means. Cooling of the extrudate upon the mandrel is facilitated by the presence of an annular recess 102 having means 103 and 104 for the supply and removal of a coolant fluid.

Turning now to the second alternate form of the first emodiment, parts corresponding to those of the principle embodiment have been designated by similar reference characters with the additional suffix "b."

In this form there is provided a fixed mandrel 107 upon which is progressively wound a spiral wire reinforcement 108. The extrudate is spiraled upon the reinforcement such that the convolutions thereof are at an angle with respect to the reinforced winding to provide additional strength. The result is a flexible tubing 109 suitable for use as air conduit means for vacuum cleaners, hair dryers and the like.

Turning now to the third embodiment of the invention, the device, generally indicated by reference character 110 is illustrated in FIGURE 4 in association with the extruding outlet 111 of an extrusion machine (not shown). As contrasted with the first embodiment, the device is aligned coaxially with the outlet, rather than disposed at right angles thereto. The outlet 111 is provided with a flange 112 which mounts a pair of ring members 113 and 114, the latter supporting a raceway 115 for ball bearings 116. A second raceway 117 is mounted on a rotating element 18 for reception of extrudate.

The rotating element 118 includes an elongated hollow sleeve 119 having first and second ends 120 and 121, respectively, the same being bounded by outer and inner cylindrical surfaces 122 and 123, respectively. Mounted upon the outer surface 122 is a pulley 124 for imparting rotational motion thereto, as well as commutator means 125 which supplies power to heating means 125a.

Secured to the end 121 is an end plate 126 having communicating bores 127 leading to the extruding head member 128. The member 128 includes communicating bores 129 and dispensing bores 130 which operate in a manner similar to that disclosed in the case of the first embodiment.

Mounted on the plate 126 is a shaft 131, the threaded end 132 thereof, engaging a correspondingly bore 133. The opposite end 134 is in the form of an enlargement to maintain for relative rotation thereupon a concentrically disposed hollow shaft 135.

With reference to FIGURE 5, the shaft 135 is provided with a pair of pulverized inserts 136 and 137. Surrounding the shaft 135 is a circular magnet 138 mounted upon a supporting bracket 139, and as seen in FIGURE 5 through magnetic action, the shaft 135 may be maintained against axial rotation while the shaft 131 rotates with motion of the head member 128. Thus, as the extrudate eminates from the head member 128, the same is spirally wound upon the shaft 135 which acts as affixed mandrels, and as the extrudate solidifies, it may be removed by sliding rightwardly as seen in FIGURE 4. It will be observed that the outer surface of the shaft 135 is preferably tapered in a direction to the right, to facilitate this removal, as when using certain types of synthetic resinous material, a degree of contraction occurs as the extrudate solidifies.

It may thus be seen that I have invented novel and highly useful improvements in synthetic resinous extrusion devices, in which there is provided a novel means for extruding filaments of snythetic resinous material in spiral form upon an axially displaceable mandrel of any desired configuration. It will be observed that not only may the cross sectional area of the mandrel be varied from point to point, but even asymmetrical elongated objects, such as table and chair legs, and the like may be similarly covered without extensive modification of the disclosed embodiment. In each of the disclosed embodiments, it is not necessary to rotate the mandrel, the spiral shape being obtained by rotating the dispensing head which continuously extrudes synthetic resinous material in filament form.

I wish it to be understood that I do not consider the invention limited to the precise details of structure shown and set forth in this specification, for obvious modifications will occurs to those skilled in the art to which the invention pertains.

I claim:

1. A device for extruding a helically formed tubing on a core for attachment to a source of extrudate at high pressures comprising attachment means for securing said device to said source, a first member having means thereon for rigid attachment to said source, said first member including a first cylindrical section having relatively smooth walls and defining an internal core material passageway and a second cylindrical section concentric thereto having extrusion threads formed on its outer surface, said first and second cylindrical sections being spaced from each other defining an extrudate bore therebetween, a second member mounted coaxialy to said first member and including a first cylindrical section positioned coaxial to and internally of said first section of said first member and having extrusion threads formed on its outer surface in cooperating relationship to the inner surface of said first section of said first member, said second member further including a second cylindrical section positioned concentric to said first member and about said second section of said first member and having relatively smooth internal walls in cooperating relationship to the extrusion threads formed on the outer surface of said second cylindrical section of said first member, said second member further including end plate means joining said first and second sections of said second member together, bearing means mounting said second member on said attachment means, drive means mounted on said second member for rotating said second member with respect to said first member, said end plate having formed therein at least one extrudate passageway and means providing an extrusion orifice secured to said end plate and rotatable therewith and in communication with said extrudate passageway for extruding extrudate which has flowed through said extrudate passageways and for depositing said extrudate in a helical array as said second member rotates with respect to said first member, said extrudate being deposited on a core material passing through said internal core material passageway formed in said first cylindrical section of said first member, said extrusion threads formed on the outer surface of said second cylindrical section of said first member and on said first cylindrical section of said second member cooperating respectively with said second cylindrical section of said second member and said first cylindrical section of said first member to provide sealing to thereby prevent the flow of said extrudate away from said extrusion orifice.

2. A device as defined by claim 1 including core means disposed within said internal core material passageway for providing core material advancing transversely of said end plate means to allow for the helical deposition thereon of said extrudate.

3. A device as defined by claim 2 wherein said core means includes a mandrel.

4. A device as defined by claim 2 wherein said core means includes a fixed mandrel having a hollow central bore and at least one lateral passage formed transverse to the axis of said mandrel.

5. A device as defined by claim 2 wherein said core means includes a fixed mandrel for receiving thereon a helical winding of reinforcing nonextensible material to form a core for the deposit therearound of said extrudate.

References Cited by the Examiner

UNITED STATES PATENTS

| | | |
|---|---|---|
| 2,127,857 | 8/1938 | Bond. |
| 2,446,057 | 7/1948 | Morin _____ 18—13 X |
| 2,457,459 | 12/1948 | Gloor _____ 18—13 |
| 2,465,482 | 3/1949 | Rhodes _____ 18—14 X |
| 2,566,846 | 9/1951 | Martin _____ 18—13 |
| 2,674,007 | 4/1954 | Alleman et al. _____ 18—13 |
| 2,878,514 | 3/1959 | Nichols et al. _____ 18—19 |
| 3,023,455 | 3/1962 | Geier et al. _____ 18—30 X |
| 3,071,917 | 1/1963 | Fisher _____ 18—19 X |

FOREIGN PATENTS 614,800  12/1948  Great Britain.

WILLIAM J. STEPHENSON, *Primary Examiner.*